US008947223B2

(12) United States Patent
McLoughlin et al.

(10) Patent No.: US 8,947,223 B2
(45) Date of Patent: Feb. 3, 2015

(54) WARNING AND SCENE LIGHTING SYSTEM

(71) Applicant: ROM Acquisition Corporation, Belton, MO (US)

(72) Inventors: John E. McLoughlin, Hauppauge, NY (US); Neocles G. Athanasiades, E. Setauket, NY (US); Kiam Meng Toh, St. James, NY (US)

(73) Assignee: ROM Acquisition Corporation, Belton, MO (US)

( * ) Notice: Subject to any disclaimer, the term of this patent is extended or adjusted under 35 U.S.C. 154(b) by 0 days.

(21) Appl. No.: 14/337,667

(22) Filed: Jul. 22, 2014

(65) Prior Publication Data

US 2014/0340214 A1 Nov. 20, 2014

Related U.S. Application Data

(63) Continuation-in-part of application No. 13/744,578, filed on Jan. 18, 2013.

(60) Provisional application No. 61/591,373, filed on Jan. 27, 2012.

(51) Int. Cl.
*B60Q 1/52* (2006.01)
*B60Q 1/26* (2006.01)

(52) U.S. Cl.
CPC .................................... *B60Q 1/2611* (2013.01)
USPC ........... 340/472; 340/331; 340/468; 340/469; 340/471; 340/478; 362/542

(58) Field of Classification Search
CPC ........ B60Q 1/10; B60Q 1/245; B60Q 1/2611; B60Q 2900/30
USPC ............ 340/472, 331, 321, 458, 815.45, 438, 340/463, 467, 468, 469, 471, 473, 478, 340/489; 362/232, 542, 545
See application file for complete search history.

(56) References Cited

U.S. PATENT DOCUMENTS

| | | | | |
|---|---|---|---|---|
| 4,835,515 | A * | 5/1989 | McDermott et al. | 340/472 |
| 5,644,291 | A * | 7/1997 | Jozwik | 340/472 |
| 7,498,933 | B2 * | 3/2009 | Pederson | 340/472 |
| 7,651,250 | B2 | 1/2010 | Griffin | |
| 8,274,397 | B2 | 9/2012 | Wilson | |
| 8,344,871 | B2 | 1/2013 | McLoughlin | |
| 8,547,219 | B2 * | 10/2013 | Kisiel | 340/468 |
| 2006/0002122 | A1 | 1/2006 | Griffin | |
| 2010/0110660 | A1 | 5/2010 | Brukilacchio | |

* cited by examiner

*Primary Examiner* — Anh V La
(74) *Attorney, Agent, or Firm* — Andrews Kurth LLP

(57) ABSTRACT

A lighting system for use with an emergency vehicle comprises at least one elongated lighting bar mounted to an exterior surface of the emergency vehicle, the lighting bar comprises a plurality of lighting elements operable to emit light, the at least one lighting bar operable to be placed in a first substantially horizontal lowered position and a second substantially vertical raised position, and a controller electrically coupled to the at least one lighting bar and configured to receive user input and controllably place the at least one lighting bar in one of a raised and lowered positions in response to the user input, the controller further configurable to operate the plurality of lighting elements in a predetermined repeating on/off sequence involving increasing number of lit lighting elements and increasing light intensity over time.

21 Claims, 5 Drawing Sheets

WARNING AND SCENE LIGHTING SYSTEM

RELATED APPLICATION

This application is a continuation-in-part application of application Ser. No. 13/744,578 filed on Jan. 18, 2013, also entitled "Warning and Scene Lighting System," which is a non-provisional patent application that claims the benefit of provisional patent application No. 61/591,373 filed on Jan. 27, 2012, which is incorporated by reference in its entirety.

FIELD

The present disclosure primarily relates to an improved warning and scene lighting system for an emergency vehicle.

BACKGROUND

Emergency vehicles such as police cars, fire trucks, and ambulance vehicles generally use warning signal lights capable of producing bright multi-colored light in flashing or rotating patterns. The primary purpose of the warning light is to greatly increase the visibility of the emergency vehicles that are often required to travel at high speed to a site requiring emergency services.

Certain emergency vehicles may be further equipped with scene lighting primarily configured to provide sufficient illumination to enable emergency personnel to safely move about and work in a darkened environment.

Recent improvements in light emitting diode (LED) technology enabled the generation of high intensity light in various colors, while having the benefits of energy efficiency and compact assembly. These advantages in the LED technology have prompted the incorporation of LEDs in warning and scene lighting for emergency vehicles.

DETAILED DESCRIPTION

Figure 1:
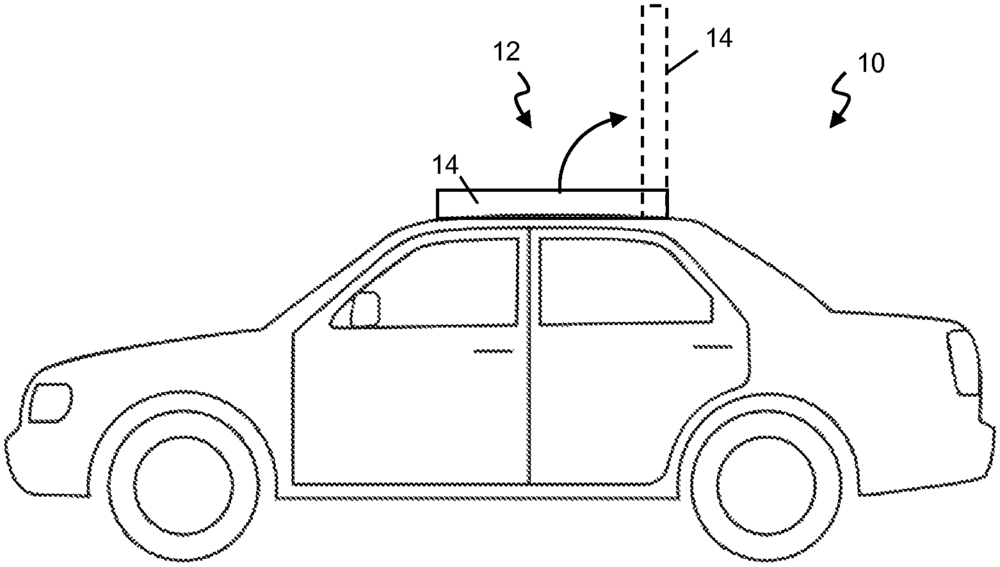
FIG. 1 is a simplified side view of an exemplary vehicle equipped with an exemplary embodiment of a warning and scene lighting system according to the present disclosure.
Figure 2:
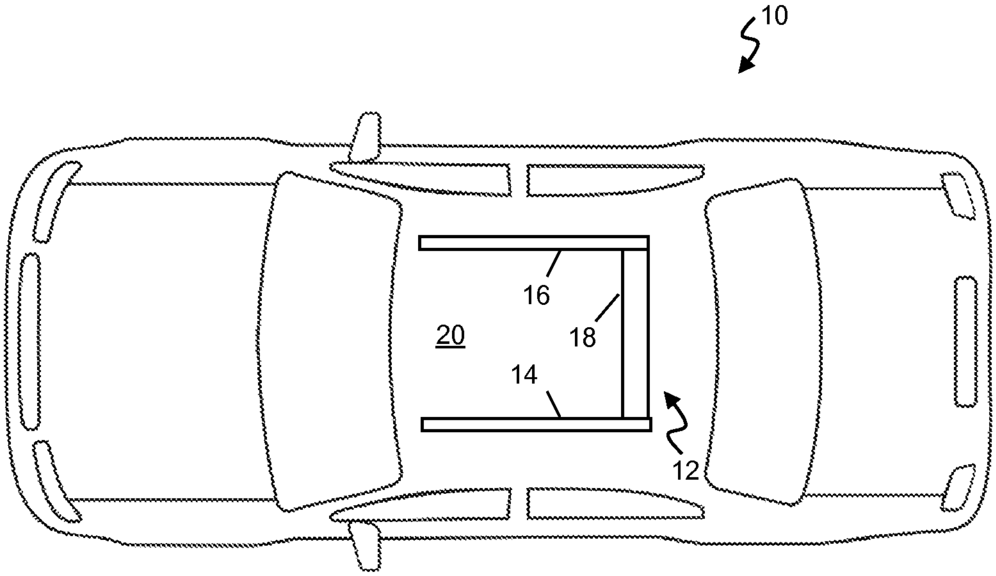
FIG. 2 is a simplified top view of an exemplary vehicle equipped with an exemplary embodiment of a warning and scene lighting system according to the present disclosure.

FIGS. 1 and 2 are simplified side and top views, respectively, of an exemplary vehicle 10 equipped with an exemplary embodiment of a warning and scene lighting system 12 according to the present disclosure. The warning and scene lighting system 12 comprises one or more lighting bars 14 and 16 that incorporate both warning lighting elements and illuminating scene lighting elements, such as LED technology and other efficient lighting technologies. A plurality of lighting elements are preferably arranged in a generally linear array on each lighting bar. The lighting bars 14 and 16 may be pivotally coupled to a base 18 that is securely affixed to the roof 20 of the emergency vehicle 10. The lighting bars may operate in multiple positions, for example, in a substantially horizontal position in parallel to the roof 20 of the vehicle, and in a substantially vertical position perpendicular to the roof 20 of the vehicle. The lighting elements in the lighting bars 14 and 16 may provide warning and scene lighting in both positions, however, the first and substantially horizontal position may be designated as the "traveling" position primarily for when the vehicle is moving, and the second and substantially vertical position may be designated as the "on-site" position to be taken when the vehicle has arrived at the site of the emergency, such as a building or house fire, crime scene, accident, traffic stop, medical emergency, etc. The lighting bars 14 and 16 may be controllably lowered and raised simultaneously or independently. The positioning of the lighting bars 14 and 16 may be remotely controlled from inside the vehicle, and the lighting bars may be raised and lowered using any suitable actuation technology, such as pneumatic, electric motors, hydraulic systems, etc. The actuation mechanism may be housed inside the base 18. The remote control may employ wireless or wired communication of control messages and commands.

The lighting bars 14 and 16 are preferably oriented such that in either the raised or lowered position, the warning and scene lighting is directed outwardly to either sides of the vehicle 10. The lighting elements therein may be mounted or configured with lenses and/or reflectors to direct and focus the illumination to shine in a predetermined desired angle, such as toward the front or back of the vehicle, and downwardly toward the ground (generally below eye-level). The scene lighting preferably includes a focus beam that can be remotely operated to pivot and/or pan to illuminate a target area. The warning lighting elements are preferably equipped with mechanism that animate the emitted light, such as rotation and/or flashing. Additionally or alternatively, the lighting bars themselves may be controlled to pivot or orient to guide the light emitted from the warning and/or scene lighting elements toward a general direction. The control system for controlling the lighting bars may incorporate a "home" configuration that is the default configuration when the lighting bars 14 and 16 are initially raised to the "on-site" position. The lighting bars may further be oriented in a second "home" configuration in the "traveling" position.

Figure 3:
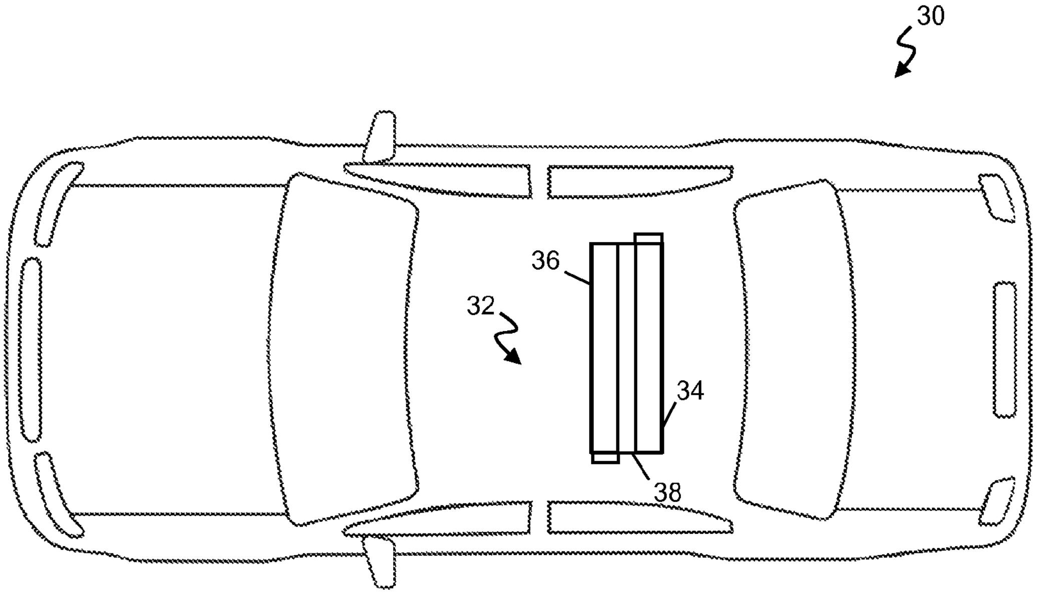
FIG. 3 is a simplified top view of another exemplary vehicle equipped with an exemplary embodiment of a warning and scene lighting system according to the present disclosure.
Figure 4:
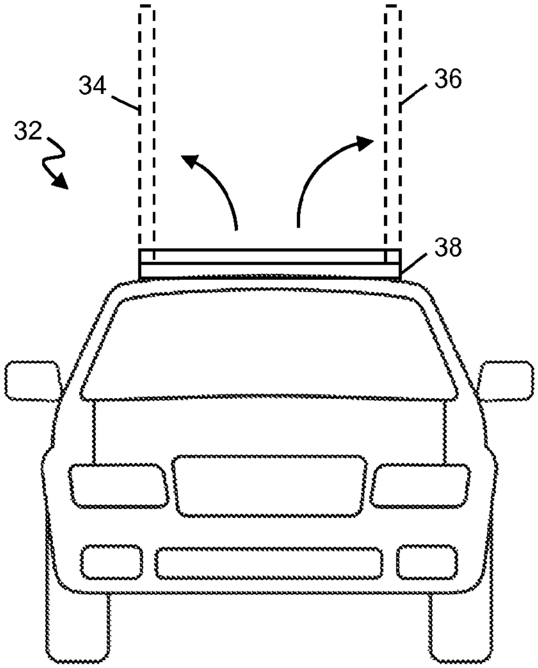
FIG. 4 is a simplified front view of the exemplary vehicle equipped with an exemplary embodiment of a warning and scene lighting system according to the present disclosure.

FIGS. 3 and 4 are simplified top and side views, respectively, of another exemplary vehicle 30 equipped with an exemplary embodiment of a warning and scene lighting system 32 according to the present disclosure. The lighting system 32 includes one or more lighting bars 34 and 36 that fold over a base 38 while in the traveling and generally horizontal position. As shown in FIG. 4, the lighting bars 34 and 36 may be raised into the on-site position after the vehicle has arrived at the site of the emergency. In the raised position, the lighting bars 34 and 36 may be oriented, simultaneously or independently, to shine the light in a particular direction to illuminate one or more selected target areas. Alternatively, as described above, one or more lighting elements in the lighting bars may be focused, oriented, or otherwise configured to shine the light in a certain desired position, using remote-control.

While in the traveling (i.e., lowered or horizontal) position, the lighting bars 34 and 36 may be remotely controlled to be pivoted or otherwise oriented to provide warning lighting forward and rearward of the vehicle, for example.

Figure 5:
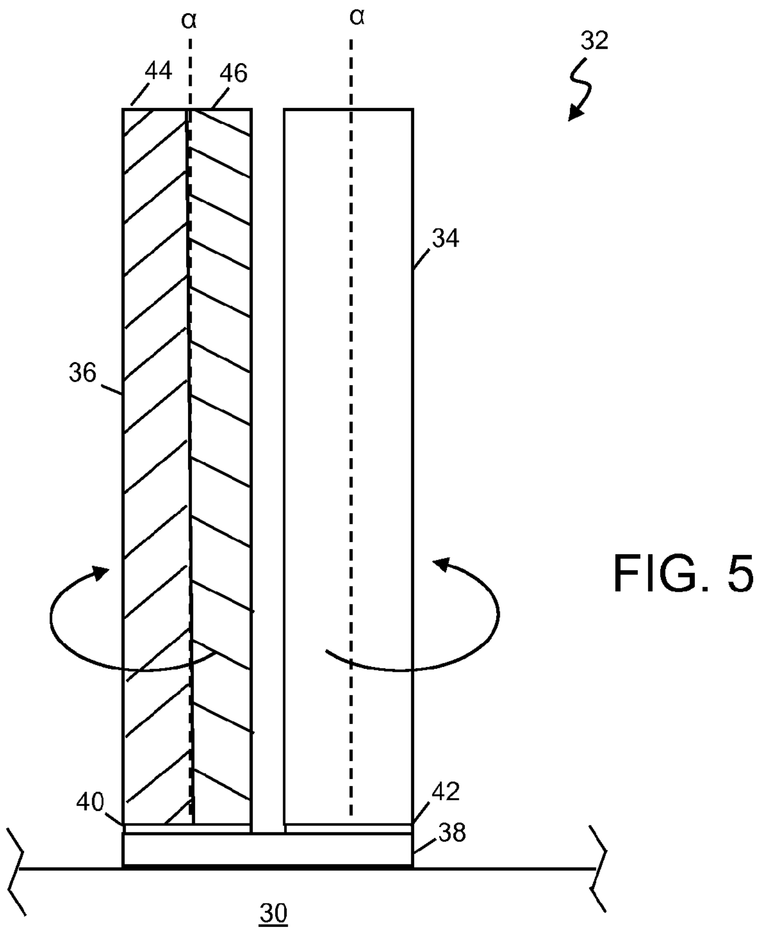
FIG. 5 is a more detailed side view of the exemplary vehicle equipped with an exemplary embodiment of a warning and scene lighting system according to the present disclosure.

FIG. 5 is a more detailed side view of the exemplary embodiment of the warning and scene lighting system 32 according to the present disclosure. As shown, one or more lighting bars 34 and 36 are coupled to the base 38 that is securely affixed to the emergency vehicle 30. Hinged connectors 40 and 42 or similar coupling may be employed to attach the lighting bars 34 and 36 to the base 38 to facilitate the lowering and raising of the light bars. Further, the hinged connectors 40 and 42 may each include a center pivot to permit the light bars 34 and 36 to rotate along a longitudinal axis $\alpha$ when they are in the raised position. The rotational capability enables the optimal positioning of the light beams emitted from the light bars 34 and 36 to ensure oncoming traffic can see the warning lights.

A plurality of lenses 44 and 46 may be employed to direct, disperse, focus, and/or intensify the illumination emitted from the warning and scene light elements. For example, the lighting bars 34 and 36 may incorporate lens(s) 44 mounted over warning lighting elements, and lens(s) 46 mounted over scene lighting elements. The warning lighting elements typically emit multi-colored (e.g., in blue, white, amber, and red combinations) bright intensity light that may be programmed to alternately turn on and off in a flashing sequence. The lens 46 may be designed to direct light emitted from the scene lighting elements to achieve a desirable beam spread vertically and horizontally. For example, it may be desirable to direct the scene lighting so that the vertical sides of the emergency vehicle are illuminated, as well as the ground on which the vehicle is parked and the surrounding scene. Further, it may be desirable that the scene lighting achieves a certain angle of beam spread above the horizontal. The warning lighting elements and scene lighting elements may operate independently, for example, the lighting bars may be controlled to emit warning lighting only, scene lighting only, and combined warning and scene lighting simultaneously.

Figure 6:
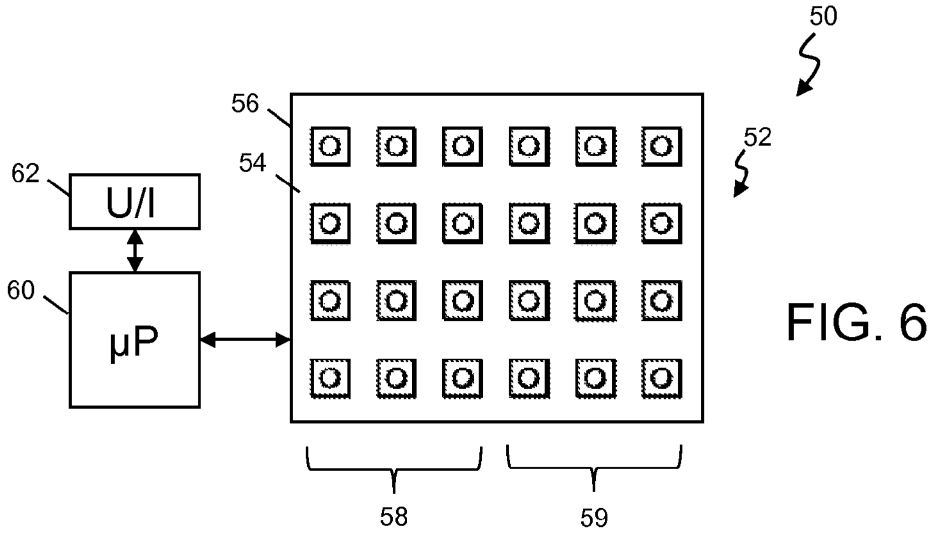
FIG. 6 is a simplified schematic diagram of an embodiment of the warning and scene lighting system according to the present disclosure.

FIG. 6 is a simplified schematic diagram of an embodiment of an electronic circuit 50 of the warning and scene lighting system 12 ad 32 according to the present disclosure. A matrix or array of lighting elements or light emitting diodes (LEDs) 52 arranged and mounted on a front side 54 of a printed circuit board 56 in a predetermined pattern. The printed circuit board 56 is securely fastened within a housing by conventional means. The plurality of LEDs 52 may be arranged in two or more separate portions exemplified by sections 58 and 59, where the first portion LEDs 58 are operable to emit bright intensity light in a first color, and second portion LEDs 59 are operable to emit bright intensity light in a second color different from the first color, for example. The LEDs may include multi-color LEDs. Further, the separate portion or grouping of LEDs may operate independently of other groups or in coordination therewith. For example, a first group of LEDs may turn on while a second group of LEDs may be off, or vice versa. Further, the light intensity of lighting elements can be selectively controlled to increase and decrease brightness. Therefore, depending on the location of the groups of the LEDs in the light bars, patterns of light and various lighting effects may be achieved. A microcontroller 60 is electrically coupled to the LEDs on the printed circuit board 56 and is configured or programmed to control their operation. The microcontroller 60 is configurable with programmable logic that turn on and off the LEDs to achieve the desired lighting effect. Desired lighting effects including one called the "Doppler Lighting Effect" are described in detail below. The microcontroller 60 is further electrically coupled to a power source and a user interface device 62 mounted in other parts of the vehicle. The user interface device 62 may be mounted in the dash of the vehicle in the form of a number of switches, knobs, joysticks, a touch panel, a keyboard, and a number of other suitable options. Other electrical or electronic components and circuitry may be mounted on the circuit board as needed.

As described above, lenses, reflectors, and other optical devices may be used to direct, intensify, focus, and disperse the emitted light as desired. These lenses may be coupled to the microcontroller 60 to enable control logic to vary the angle of the lenses to achieve the desired lighting effects. The circuitry 50 is preferably hermetically sealed within the housing to protect the circuit components from the elements.

Figure 7:
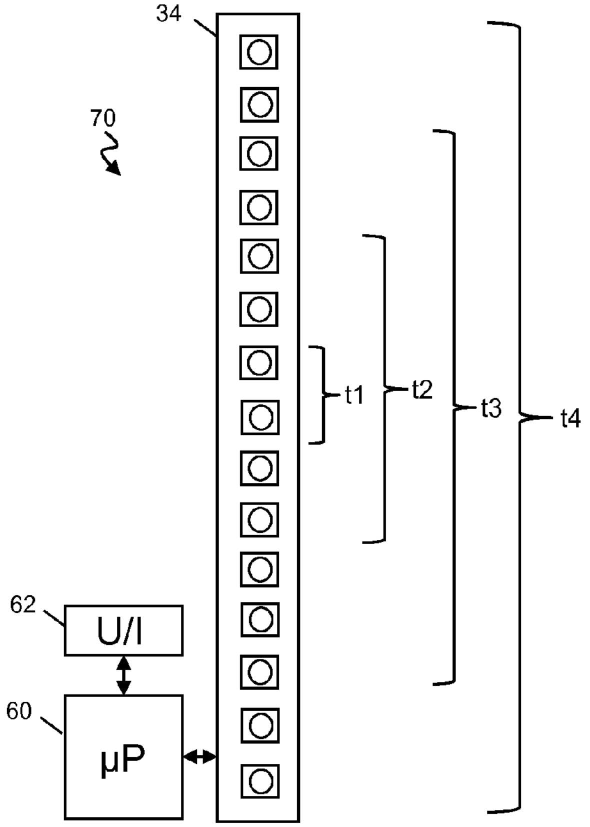
FIG. 7 is a simplified schematic diagram of an embodiment of the warning and scene lighting system according to one exemplary method of operation.

FIG. 7 is a simplified schematic diagram of an embodiment of the warning and scene lighting system according to one exemplary method of operation. The lighting bar 34 comprises a linear sequence or array of lighting elements or LEDs 70. The lighting elements 70 are coupled to the microcontroller 60 and are under its control to achieve one or more lighting effects. The user or driver may program the microcontroller 60 and lighting elements 70 via the user interface 62. As illustrated in FIG. 7, the LEDs 70 are programmed to be lit in a predetermined sequence indicated by t1, t2, t3, and t4. In a first time period, t1, the respective group of LEDs are the only ones that are lit with a first predetermined degree of brightness; in a second time period, t2, the respective group of LEDs are the only ones that are lit with a second predetermined degree of brightness; in a third time period, t3, the respective group of LEDs are the only ones that are lit with a third predetermined degree of brightness; and in a fourth time period, t4, the respective group of LEDs are the only ones that are lit with a fourth predetermined degree of brightness, which in this case is all of the LEDs. As the number of lit LEDs increases over time, the brightness of the lit LEDs also increases. This lighting sequence is called the "Doppler Lighting Effect" as the number of lighting elements that are lit and light intensity of each lit LED increase over time. The lit area starts in the middle of the light bar, and the lit area expands, becomes brighter, and becomes elongated over time. This lighting effect thus enhances the visual effect for an approaching vehicle with increasingly brighter light intensity and enlarging lit area. The sequence may cycle from t4 back to t1, or it may cycle in the reverse sequence from t4 to t3.

Figure 8:
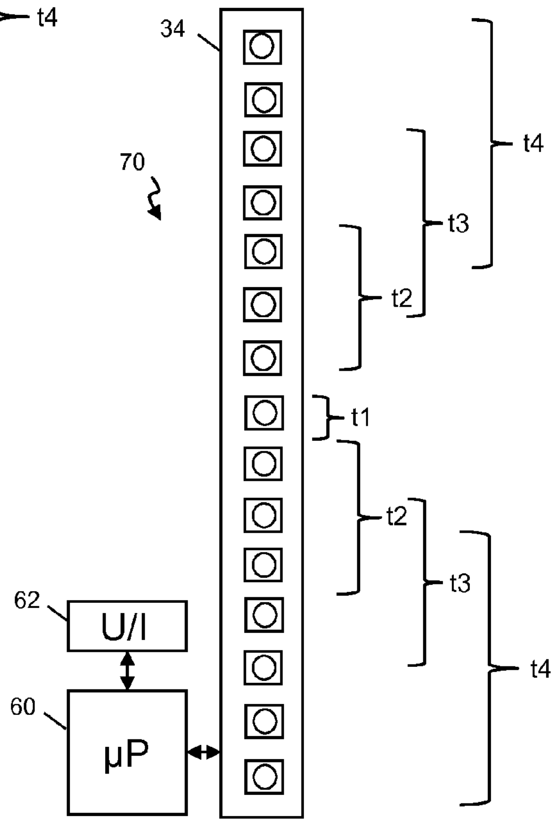
FIG. 8 is a simplified schematic diagram of an embodiment of the warning and scene lighting system according to another exemplary method of operation.

FIG. 8 is a simplified schematic diagram of an embodiment of the warning and scene lighting system according to another exemplary method of operation. The lighting bar 34 comprises a linear sequence of lighting elements or LEDs 70. The lighting elements or LEDs 70 are programmed to be lit in a predetermined sequence indicated by t1, t2, t3, and t4. In a first time period, t1, the respective group of LEDs are the only ones that are lit; in a second time period, t2, the respective group of LEDs are the only ones that are lit; in a third time period, t3, the respective group of LEDs are the only ones that are lit; and in a fourth time period, t4, the respective group of LEDs are the only ones that are lit, which in this case is all of the LEDs. As above, the lit LEDs may also increase in light intensity over time. This lighting sequence involves increasing number of lit lighting elements, increasing light intensity of each lit LED, and increasing distance between the two lit areas over time. The lit area starts in the middle of the light bar, and the lit area separates into two expanding and enlarging areas over time. The lit area begins in the center of the light bar, but then divides and expands towards the two ends of the light bar, and getting brighter at the same time. This lighting effect also enhances the visual effect for an approaching vehicle with increasingly brighter light intensity and enlarging lit area. The sequence may cycle from t4 back to t1, or it may cycle in the reverse sequence from t4 to t3.

Figure 9:
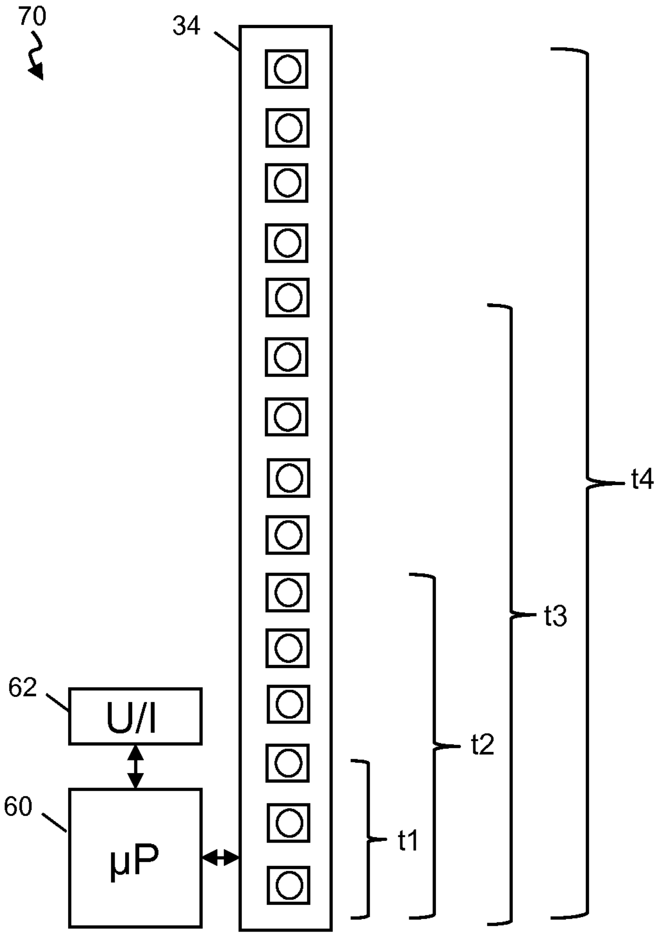
FIG. 9 is a simplified schematic diagram of an embodiment of the warning and scene lighting system according to yet another exemplary method of operation.

FIG. 9 is a simplified schematic diagram of an embodiment of the warning and scene lighting system according to yet another exemplary method of operation. The lighting bar 34 comprises a linear sequence of lighting elements or LEDs 70. The lighting elements or LEDs 70 are programmed to be lit in a predetermined sequence indicated by t1, t2, t3, and t4. In a first time period, t1, the respective group of LEDs are the only ones that are lit; in a second time period, t2, the respective group of LEDs are the only ones that are lit; in a third time period, t3, the respective group of LEDs are the only ones that are lit; and in a fourth time period, t4, the respective group of LEDs are the only ones that are lit, which in this case is all of the LEDs. This lighting sequence involves increasing number of lighting elements that are lit, increasing light intensity of each lit LED, and increasing distance between the lit areas over time. The lit area starts at one end of light bar, and the lit area elongates over time until all of the LEDs are lit. This lighting effect enhances the visual effect for an approaching vehicle with increasingly brighter light intensity and enlarging lit area. The starting point for the lit area may be at either end of the light bar. The sequence may cycle from t4 back to t1, or it may cycle in the reverse sequence from t4 to t3.

Further notice should be given regarding the actual implementation of the system in that certain changes and modifications to the described system, though not described explicitly or in detail, are contemplated herein. For example, the microcontroller may be implemented using one or more CPU, processors, and/or micro-controller circuits. Further, it is understood that a CPU is typically in operation with its attendant circuitry and software, such as memory, interfaces, drivers, etc. as known in the art. Additionally, although not shown explicitly, the system includes memory that may be implemented using one or more data storage elements of a variety of types now known or later developed. Similarly, the system may employ wireless communication that may be achieved using any technology and protocol suitable for the firefighting application. Although wireless communication is the general way information may be conveyed, the communication between the microcontroller and any controlled component and sensor may be achieved by wired and/or wireless means.

Although the exemplary views provided herein depict the lighting system mounted on a sedan-type police vehicle, the lighting system may be employed for use with all forms of vehicles, such as police and security vehicles, firefighting vehicles, ambulances, search and rescue vehicles, utility trucks, etc. Alternatively, the lighting systems may be used for non-vehicle applications as well, such as on the roof of a building, wall, or other structures.

Although the present disclosure describes and illustrates the warning and scene lighting system as having particular predetermined traveling and on-site positions, these are provided as exemplary implementations. The on-site or raised and traveling or lowered positions may be modified or adapted to different applications as necessary. For example, there may be some applications where the on-site position of the lighting bars is preferably substantially horizontal, and the traveling position is preferably substantially vertical.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

What is claimed is:

1. A lighting system for use with an emergency vehicle comprising:

at least one elongated lighting bar mounted to an exterior surface of the emergency vehicle, the lighting bar comprises a plurality of lighting elements operable to emit light;

the at least one lighting bar operable to be placed in a first substantially horizontal lowered position and a second substantially vertical raised position; and a controller electrically coupled to the at least one lighting bar and configured to receive user input and controllably place the at least one lighting bar in one of a raised and lowered positions in response to the user input, the controller further configurable to operate the plurality of lighting elements in both the raised and lowered positions in a predetermined repeating on/off sequence involving increasing number of lit lighting elements and increasing light intensity of each lit lighting element over time.

2. The lighting system of claim 1, wherein the plurality of lighting elements are operable to emit high-intensity light of at least two predetermined colors.

3. The lighting system of claim 1, further comprising an actuation mechanism coupled to the controller and one end of the at least one lighting bar operable to pivotally raise and lower the at least one lighting bar.

4. The lighting system of claim 1, further comprising an actuation mechanism coupled to the controller and one end of the at least one lighting bar operable to rotate the at least one lighting bar about its longitudinal axis in the substantially vertical raised position to direct the emitted light toward a target area.

5. The lighting system of claim 1, further comprising a user interface device electrically coupled to the controller and configured to receive and communicate the user input to the controller.

6. The lighting system of claim 1, wherein the controller is configured to independently raise and rotate the at least one lighting bar.

7. The lighting system of claim 1, wherein the plurality of lighting elements comprise a first grouping of lighting elements operable to emit high-intensity white light, and a second grouping of lighting elements operable to emit high-intensity light in at least one color other than white, wherein the first and second groupings of lighting elements are independently controllable by the controller.

8. The lighting system of claim 1, the controller further configurable to operate the plurality of lighting elements in a predetermined on/off sequence involving at least one lit lighting element in a first lighting intensity in the general center of the lighting bar, to at least two lit lighting elements in a second light intensity higher than the first lighting intensity including the at least one lit lighting element, to at least three lit lighting element in a third lighting intensity higher than the second light intensity including the at least two lit lighting element, and so on until all of the lighting elements in the lighting bar are lit.

9. The lighting system of claim 1, the controller further configurable to operate the plurality of lighting elements in a predetermined on/off sequence involving at least one lit lighting element of the lighting bar, to at least two lit lighting elements including the at least one lit lighting element, to at least three lit lighting element including the at least two lit lighting element, and so on until all of the lighting elements in the lighting bar are lit.

10. A method of operating a lighting system mounted on an emergency vehicle comprising:

receiving user input to raise at least one elongated lighting bar having a plurality of lighting elements arranged in a substantially linear array to a generally vertical position;

raising the at least one lighting bar to a generally vertical position in response to the user input; and automatically operating the plurality of lighting elements according to a predetermined repeating on/off sequence involving at least one lit lighting element in a first lighting intensity in the general center of the lighting bar, to at least two lit lighting elements in a second light intensity higher than the first lighting intensity including the at least one lit lighting element, to at least three lit lighting element in a third lighting intensity higher than the second light intensity including the at least two lit lighting element, and so on until all of the lighting elements in the lighting bar are lit.

11. The method of operating a lighting system of claim 10, further comprising receiving user input to rotate the at least one lighting bar about its longitudinal axis.

12. The method of operating a lighting system of claim 10, wherein automatically operating the plurality of lighting elements comprises automatically operating according to a predetermined on/off sequence involving at least one lit lighting element located near the center of the lighting bar, to at least two lit lighting elements including the at least one lit lighting element, to at least three lit lighting element including the at least two lit lighting element, and so on until all of the lighting elements in the lighting bar are lit.

13. The method of operating a lighting system of claim 10, wherein automatically operating the plurality of lighting elements comprises automatically operating according to a predetermined on/off sequence involving at least one lit lighting element located near one end of the lighting bar, to at least two lit lighting elements including the at least one lit lighting element, to at least three lit lighting element including the at least two lit lighting element, and so on until all of the lighting elements in the lighting bar are lit.

14. The method of operating a lighting system of claim 10, wherein automatically operating the plurality of lighting elements comprises automatically operating according to a predetermined on/off sequence involving at least one lit lighting element located near the center of the lighting bar, to at least two lit lighting elements located near the center of the lighting bar but not including the at least one lit lighting element, to at least four lit lighting element located near the center of the lighting bar but not including at least one lit lighting element near the center of the lighting bar, to at least six lit lighting element located near the center of the lighting bar but not including the at least one lit lighting element near the center of the lighting bar, and so on until the lighting elements at both ends of the lighting bar are lit.

15. The method of operating a lighting system of claim 10, further comprising repeating the predetermined on/off sequence.

16. The method of operating a lighting system of claim 10, further comprising receiving user input for programming a lighting sequence of the lighting elements.

17. The method of operating a lighting system of claim 10, further comprising controllably operating the lighting elements as warning lighting and scene lighting.

18. An emergency lighting system comprising:

at least two lighting bars mounted to a horizontally-mounted base, the lighting bars each comprises a plurality of lighting elements operable to emit high-intensity light;

the at least two lighting bars having two operating positions, a first substantially lowered position and a second substantially raised position; and a controller electrically coupled to the at least two lighting bars and configured to receive user input and controllably selectively place one or more of the lighting bars in one of a raised and lowered positions in response to the user input, the controller further configured to operate the plurality of lighting elements in a predetermined repeating on/off sequence involving increasing number of lit lighting elements and increasing light intensity over time.

19. The lighting system of claim 18, wherein the at least two lighting bars are each pivotally mounted at one end to the base securely affixed to the roof of an emergency vehicle.

20. The lighting system of claim 18, further comprising an actuation mechanism coupled to the controller and the at least two lighting bars operable to independently raise, lower, and orient the at least two lighting bars.

21. The lighting system of claim 18, wherein the controller is configurable to operate the plurality of lighting elements in a predetermined on/off sequence at least one lit lighting element in a first lighting intensity in the general center of the lighting bar, to at least two lit lighting elements in a second light intensity higher than the first lighting intensity including the at least one lit lighting element, to at least three lit lighting element in a third lighting intensity higher than the second light intensity including the at least two lit lighting element, and so on until all of the lighting elements in the lighting bar are lit.

* * * * *